United States Patent [19]

Ito et al.

[11] Patent Number: 4,644,346

[45] Date of Patent: Feb. 17, 1987

[54] MULTIPLEX TRANSMISSION SYSTEM

[75] Inventors: Tetsuo Ito; Setsuo Arita, both of Hitachi, Japan

[73] Assignee: Hitachi, Ltd., Tokyo, Japan

[21] Appl. No.: 658,022

[22] Filed: Oct. 5, 1984

[30] Foreign Application Priority Data

Oct. 5, 1983 [JP] Japan ............................ 58-185065

[51] Int. Cl.[4] ........................ G08B 5/22; G08B 5/00; G01J 1/34

[52] U.S. Cl. ........................ 340/825.03; 340/825.06; 340/825.04

[58] Field of Search ..................... 340/825.03, 825.06, 340/825.1, 825.04; 307/29, 40, 115, 132 E, 141; 455/78, 88

[56] References Cited

U.S. PATENT DOCUMENTS 3,162,809 12/1964 Yax ...................................... 455/78
4,112,416 9/1978 Hasegawa et al. ............ 340/825.06

*Primary Examiner*—Ulysses Weldon
*Assistant Examiner*—Ralph Smith
*Attorney, Agent, or Firm*—Antonelli, Terry & Wands

[57] ABSTRACT

The present invention consists in disposing a first transmission unit in a control panel which is installed in a central control room, and a second transmission unit in a control device which is installed near an equipment to-be-controlled of a plant. The first transmission unit and the second transmission unit are connected by a cable. Each of the first transmission unit and the second transmission unit comprises a transmitter, a receiver, a serializer, a deserializer, change-over means and change-over control means. The serializer, which produces a serial information signal wherein a plurality of received information signals are arrayed in series, is connected to the transmitter. The deserializer separates a serial information signal delivered from the receiver, into a plurality of information signals. The plurality of change-over means connect a plurality of signal transmission cables respectively connected thereto, to the serializer or the deserializer. The plurality of change-over control means control connectional statuses of the corresponding change-over means on the basis of the respective information signals separated and delivered by the deserializer.

11 Claims, 11 Drawing Figures

MULTIPLEX TRANSMISSION SYSTEM

BACKGROUND OF THE INVENTION

The present invention relates to a multiplex transmission system, and more particularly to a multiplex transmission system which is well suited for application within a control panel and a control device, between a plurality of control panels, or between a control panel and a control device.

Heretofore, such controllers as switches and levers and such indicators as lamps and meters within a control panel are connected to a plurality of control devices through cables. In recent years, the promotion of automation and the intensification of monitoring functions in a plant have increased the number of cables, so that wiring operations have become conspicuously troublesome and the period of time necessary for the wiring has been prolonged.

For the simplification of the wiring operations, the adoption of multiplex transmission technology is readily considered particularly when digital signals are to be handled.

Cables which are connected to the controllers and indicators within the control panel are first collected by a multiplex transmission processing unit. Also in the plurality of control devices, the cables of signals to be coupled with the control panel are collected by respective multiplex transmission processing units. With this measure, the cables between the control panel and each control device are collected into a single cable, and a sharp reduction in the number of cables becomes possible.

With the multiplex transmission technology, however, attention must be paid to the directivities of signals ordinarily. Regarding the controller and the indicator, the transmission directions of their respective signals are opposite within the control panel. As to the former, the signal is transmitted toward the control device, whereas as to the latter, the signal is transmitted so as to arrive from the control device. In connecting the cables to the multiplex transmission processing units, accordingly, consideration must be given to such directivities of the signals.

The prior-art multiplex transmission system as described above includes a multiplex transmission processing unit TRU(1) in the control panel, and the multiplex transmission processing unit TRU(2) in the control device. The multiplex transmission processing unit TRU(1) has a transmitter $T_1$ and a receiver $R_1$, and also has a serializer or parallel-to-series converter $P/S_1$ connected to the transmitter $T_1$ and a deserializer or series-to-parallel converter $S/P_1$ connected to the receiver $R_1$. The multiplex transmission processing unit TRU(2) has a transmitter $T_2$ and a receiver $R_2$, and also has a serializer $P/S_2$ connected to the transmitter $T_2$ and a deserializer $S/P_2$ connected to the receiver $R_2$. The transmitter $T_1$ and the receiver $R_2$ are connected by a cable $CA_1$. A cable $CA_2$ connects the transmitter $T_2$ and the receiver $R_1$. Among the cables within the control panel, those for transmitting the signals toward the control device are fixed to the serializer $P/S_1$. The remaining cables within the control panel for receiving the signals sent from the control device are fixed to the deserializer $S/P_1$. Likewise to those within the control panel, the respective cables are fixed to the serializer $P/S_2$ and deserializer $S/P_2$ of the multiplex transmisstion processing unit TRU(2) within the control device.

At the time of design and in the wiring operations, accordingly, which of the terminals of the serializer P/S and the deserializer S/P the cables C must be connected to need to be determined depending upon the transmission directions of the signals of the respective cables C as stated before. In general, the numbers of terminals of the serializer P/S and the deserializer S/P are predetermined. For this reason, as the cables C are connected to the terminals of the serializer P/S and the deserializer S/P, it can occur that more of the terminals of the serializer P/S are provided than needed, whereas the number of terminals of the deserializer S/P are is insufficient. That is, wiring alterations and additional wiring which sometimes take place during the adjustments of the plant cannot be flexibly coped with.

SUMMARY OF THE INVENTION

An object of the present invention is to provide a multiplex transmission system in which wiring operations can be performed readily without considering the transmission directions of signals.

The present invention is characterized by comprising a transmitter, a receiver, a serializer which is connected to the transmitter, a deserializer which is connected to the receiver, switching means connected to a signal transmission line and for connecting the signal transmission line to either of the serializer and the deserializer, and means for controlling a connectional status of the switching means on the basis of an output signal of the deserializer.

According to the present invention, even when a designer or a worker is not conscious of the transmission directions of signals in connecting respective cables, the system side detects the presence or absence of a signal and automatically forms a signal channel. Accordingly, the invention can greatly contribute to the alleviation of the design or wiring operation of a control panel or control device in which the quantity of wiring has increased more and more in recent years. Besides, it can flexibility cope with the alterations and addition of wiring.

DESCRIPTION OF THE PREFERRED EMBODIMENTS

Figure 1:
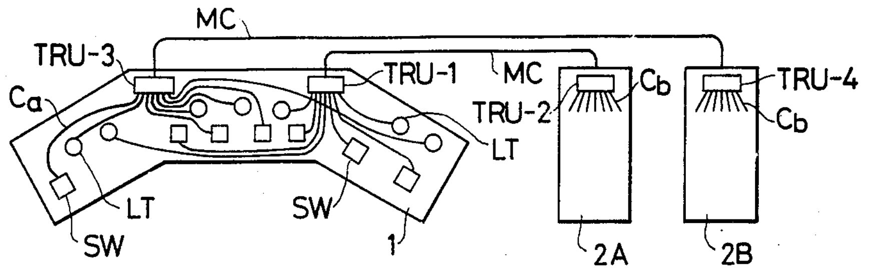
FIG. 1 is a schematic arrangement diagram of a multiplex transmission system which is an embodiment of the present invention.

A multiplex transmission system, which is one preferred embodiment of the present invention, will be described with reference to FIGS. 1 and 2. A control panel 1 is arranged in the central control room of a plant, while control devices 2A and 2B are arranged near the equipment to-be-controlled in the plant. The control panel 1 is furnished with controllers SW, such as switches and levers, and indicators LT, such as lamps and meters, at positions easily seen by an operator who operates the plant. Multiplex transmission processing units TRU-1 and TRU-3 are disposed in the control panel 1. A multiplex transmission processing unit TRU-2 is disposed in the control device 2A, and one TRU-4 in the control device 2B. The multiplex transmission processing units TRU-1 and TRU-2, and those TRU-3 and TRU-4 are respectively connected by cables MC. The controllers SW and the indicators LT are connected with the multiplex transmission processing units TRU-1 and TRU-3 by cables Ca which are arranged within the control panel 1. Cables Cb arranged within the control devices 2A and 2B are connected to the multiplex transmission processing unit TRU-2 or TRU-4. The ends of the cables Cb remote from the multiplex transmissions processing unit TRU-2 or TRU-4 are connected to the controllers (not shown) of the equipment to-be-controlled disposed in the plant or measuring instruments (not shown) disposed in the plant.

Figure 2:
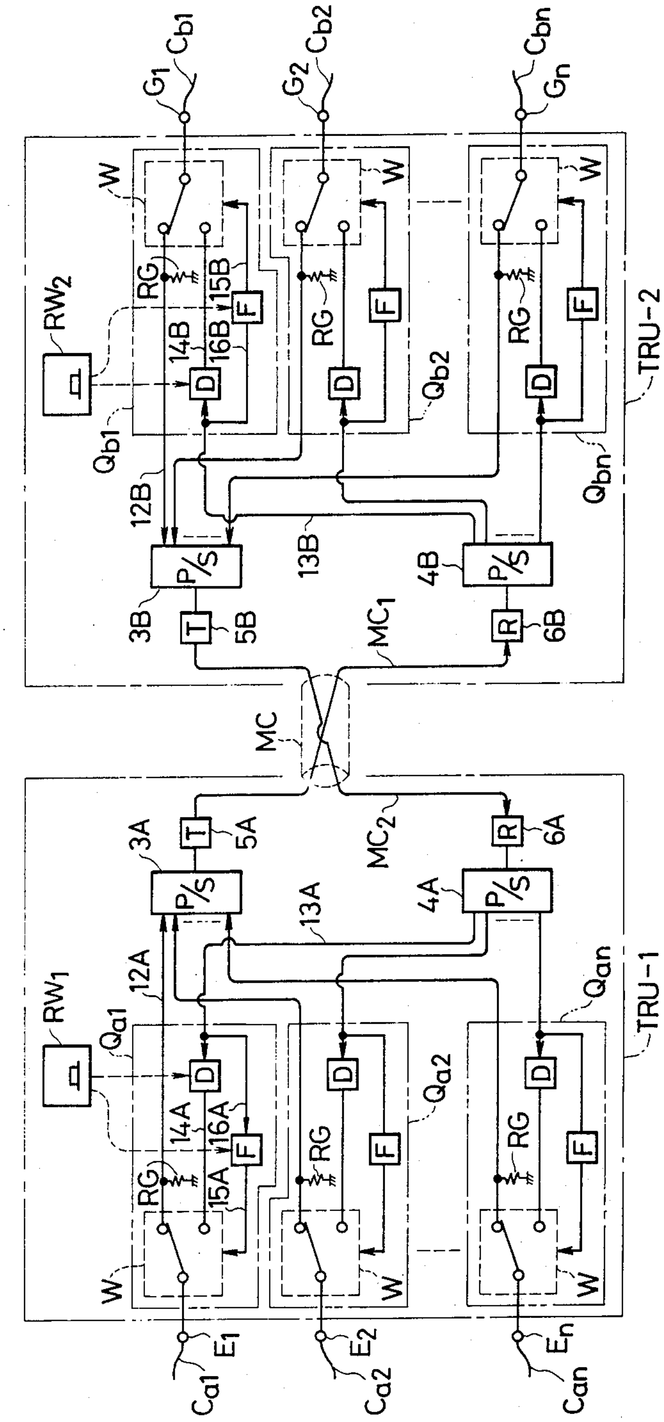
FIG. 2 is a detailed arrangement diagram of the multiplex transmission system shown in FIG. 1.

FIG. 2 shows the detailed structures of the multiplex transmission processing units TRU-1 and TRU-2 which are connected to each other by the cable MC. The multiplex transmission processing units TRU-3 and TRU-4 are the same in arrangement as those TRU-1 and TRU-2 shown in FIG. 2.

Figure 3:
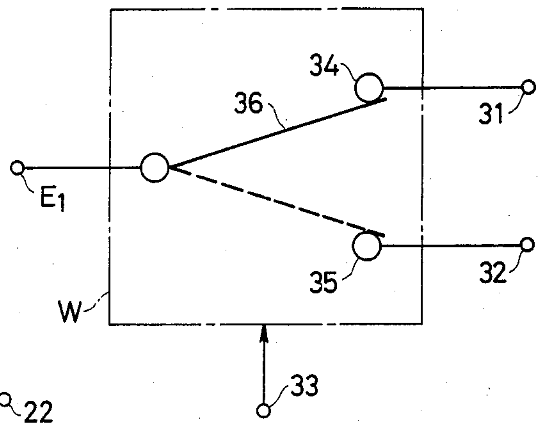
FIG. 3 is a detailed arrangement diagram of a switching circuit in FIG. 2.
Figure 5:
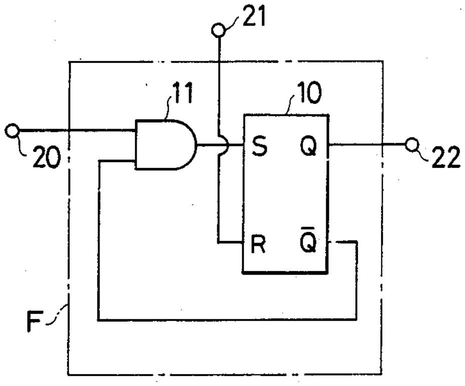
FIG. 5 is an arrangement diagram of a memory circuit in FIG. 2.
Figure 4:
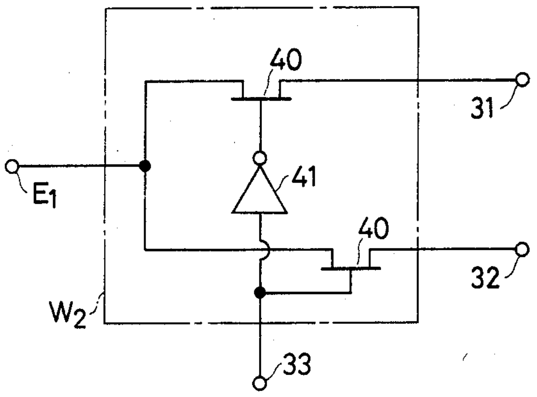
FIG. 4 is an arrangement diagram of another embodiment of the switching circuit.

The arrangement of the multiplex transmission processing unit TRU-1 will be explained below with reference to FIG. 2. The multiplex transmission processing unit TRU-1 is constructed of transmission line change-over circuits Qa1, Qa2, . . . and Qan, a serializer or parallel-to-series converter 3A, a deserializer or series-to-parallel converter 4A, a transmitter 5A and a receiver 6A. As shown in FIG. 2, the transmission line change-over circuit Qa1 is composed of a resistor RG, a switching circuit W, a memory circuit F and a delay circuit D. As shown in FIG. 3, the switching circuit W includs a movable contact 36, and stationary contacts 34 and 35 with which one end of the movable contact 36 comes into contact. The other end of the movable contact 36 is connected to a terminal E1, the stationary contact 34 to a terminal 31, and the stationary contact 35 to a terminal 32. The connectional relationship between the movable contact 36 and the stationary contact 34 and 35 is determined by the value of a signal entering a control terminal 33. That is, when "0" is applied to the control terminal 33, the movable contact 36 is connected to the stationary contact 34, and when "1" is applied to the control terminal 33, the movable contact 36 is connected to the stationary contact 35. FIG. 4 shows an embodiment of the switching circuit. This switching circuit W2 is implemented as a semiconductor device, and includes two field-effect transistors (FETs) 40 and a NOT circuit 41. This circuit performs the same switching function as that of the switching circuit W in FIG. 3. The arrangement of the memory circuit F is shown in FIG. 5. The memory circuit F is composed of a set-reset (SR) type flip-flop 10 and an AND circuit 11. A terminal 20 is connected to one input side of the AND circuit 11, and the $\overline{Q}$ output terminal of the flip-flop 10 is connected to the other input side of the AND circuit 11. The output terminal of the AND circuit 11 is connected to the S input terminal of the flip-flop 10. A terminal 21 is connected to the R input terminal of the flip-flop 10, and a terminal 22 to the Q output terminal thereof. The function of the memory circuit F will be explained. By applying "1" to the R input terminal through the terminal 21, the Q output terminal is set at "0", and the $\overline{Q}$ output terminal at "1". Subsequently, when "1" is applied to the terminal 20, this signal passes through the AND circuit 11 and enters the S input terminal, to bring the output of the Q output terminal of the flip-flop 10 into "1" and the output of the $\overline{Q}$ output terminal into "0". In particular, the output signal "0" of the $\overline{Q}$ output terminal disables the AND circuit 11. Accordingly, whichever signal may be thereafter applied to the terminal 20, the output of the Q output terminal is held at "1" at all times.

The switching circuit W, memory circuit F and delay circuit D which constitute the aforementioned transmission line change-over circuit Qa1 are connected as follows. The terminal 32 is connected to the output side terminal of the delay circuit D by a wiring lead 14A, and the terminal 22 of the memory circuit F to the control terminal 33 of the switching circuit W by a wiring lead 15A. The terminal 31 of the switching circuit W is held in communication with the serializer 3A by a wiring lead 12A. This wiring lead 12A connecting the terminal 31 and the serializer 3A is grounded through the resistor RG. The input side terminal of the delay circuit D is held in communication with the deserializer 4A by a wiring lead 13A. A wiring lead 16A connected to the wiring lead 13A is fixed to the terminal 20 of thememory circuit F. Terminals E2, . . . and En are connected to the movable contacts 36 of the switching circuits W of the respective transmission line change-over circuits Qa2, . . . and Qan. The transmission line change-over circuits Qa2, . . . and Qan are the same in arrangement as the transmission line change-over circuit Qa1. The terminals 31 of the transmission line change-over circuits Qa2, . . . and Qan are all connected to the serializer 3A, while the terminals 20 of the transmission line change-over circuits Qa2, . . . and Qan and the input sides of the delay circuits D are all connected to the deserializer 4A. The transmitter 5A and the serializer 3A are held in communication; so are the receiver 6A and the deserializer 4A. A reset switch RW1 is connected to the delay circuit D and the terminal 21 of the memory circuit F.

The multiplex transmission processing unit TRU-2 has the same arrangement as that of the multiplex transmission processing unit TRU-1. That is, it includes transmission line change-over circuits Qb1, Qb2, . . . and Qbn each being the same in arrangement as the transmission line change-over circuit Qa1, a serializer 3B, a deserializer 4B, a transmitter 5B, a receiver 6B and a reset switch RW2. Terminals G1, G2, . . . and Gn are connected to the movable contacts 36 of the respective transmission line change-over circuits Qb1, Qb2, . . . and Qbn. The switching circuit W, memory circuit F and delay circuit D which constitute the transmission line change-over circuit Qb1 are connected as follows. The terminal 32 of the switching circuit W is connected to the output side terminal of the delay circuit D by a wiring lead 14B, and the terminal 22 of the memory circuit F to the control terminal 33 of the switching circuit W by a wiring lead 15B. The terminal 31 of the switching circuit W is held in communication with the serializer 3B by a wiring lead 12B. This wiring lead 12B connecting the terminal 31 and the serializer 3B is grounded through the resistor RG. The input side terminal of the delay circuit D is held in communication with the deserializer 4B by a wiring lead 13B. A wiring lead 16B connected to the wiring lead 13B is fixed to the terminal 20 of the memory circuit F.

The transmitter 5A and receiver 6A of the multiplex transmission processing unit TRU-1 are respectively held in communication with the receiver 6B and transmitter 5B of the multiplex transmission processing unit TRU-2 by the multiplex cable MC. More specifically, the multiplex cable MC has two transmission lines MC1 and MC2, the former of which holds the transmitter 5A and the receiver 6B in communication and the latter of which holds the transmitter 5B and the receiver 6A.

Next, the wiring operation of the cables will be described. Cables Ca1, Ca2, . . . and Can, which are laid in the control panel 1 and which are connected to the controllers SW or the indicators LT for the control device 2A, are successively connected to the terminals E1, E2, . . . and En of the multiplex transmission processing unit TRU-1 by a worker without considering the transmission directions of signals. Cables Cb1, Cb2, . . . and Cbn laid in the control device 2A (connected to the controllers or measuring instruments of the equipment to-be-controlled of the plant) are successively connected to the terminals G1, G2, . . . and Gn of the multiplex transmission processing unit TRU-2 by the worker without considering the transmission directions of signals. However, the connection of the cables Ca1, Ca2, . . . and Can to the respective terminals E1, E2, . . . and En and the connection of the cables Cb1, Cb2, . . . and Cbn to the respective terminals G1, G2, . . . and Gn need to correspond so that the cable Ca connected to the controller SW of the control panel may be brought into communication with the cable Cb connected to the equipment to-be-controlled which is controlled by receiving the signal of the particular controller SW, and that the cable Cb connected to the measuring instrument of the plant may be brought into communication with the cable Ca connected to the indicator LT which indicates the measured value of the particular instrument. The laying operations of the cables Ca1, Ca2, . . . and Can and those Cb1, Cb2, . . . and Cbn must consider such point, but need not consider the transmission directions' of signals. Accordingly, they are remarkably facilitated, and the period of time required therefor is remarkably shortened.

After the connecting operations of the cables have been completed, the reset switches RW1 and RW2 of the respective multiplex transmission processing units TRU-1 and TRU-2 are depressed. Thus, the contents of the delay circuits D within the respective processing units are cleared, and the flip-flops 10 of the memory circuits F are reset to bring the signals of the Q output terminals into "0". Under this state, as illustrated in FIG. 2, all the cables Ca1, Ca2, . . . and Can are connected to the input side of the serializer 3A, while all the cables Cb1, Cb2, . . . and Cbn are connected to the input side of the serializer 3B. All the input side terminals of the serializers 3A and 3B have the resistors RG connected in parallel therewith, so that the serializers 3A and 3B are equivalently supplied with the value "0" in the no-signal state in which no signal is applied to the terminals E1, E2, . . . and En and G1, G2, . . . and Gn.

The serializer 3A or 3B includes a shift register, now shown, which consists of the same number of (n) flip-flops as the number of the transmission line changeover circuits Qa1–Qan (or the transmission line changeover circuits Qb1–Qbn). Thus, n information signals which are transmitted by the n wiring leads 12A (or 12B) respectively connected to the transmission line change-over circuits Qa1–Qan (or Qb1–Qbn) are fed into the shift register successively every bit from the transmission line change-over circuit Qa1 toward the transmission line change-over circuit Qan, to be turned into a serial signal in which the n information signals each being of 1 bit are arrayed in series and which is delivered to the transmitter 5A (or 5B). The deserializer 4A or 4B includes a shift register, not shown, which consists of the same number of (n) flip-flops as the number of the transmission line change-over circuits Qa1–Qan (or the transmission line change-over circuits Qb1–Qbn). Thus, a serial signal which is sent by the transmission line MC2 (or MC1) and in which a plurality of 1-bit information signals are arrayed in series is separated by the shift register into the n information signals, which are respectively delivered to the n wiring leads 13A (or 13B) connected to the transmission line change-over circuits Qa1–Qan (or Qb1–Qbn). The respective wiring leads 13A (or 13B) numbering n are connected to the n flip-flops of the shift register of the deserializer 4A (or 4B). Since both the multiplex transmission units TRU-1 and TRU-2 have the same functions, the flow of signals from the former TRU-1 to the latter TRU-2 will be described. The signal "0" in this direction is transferred through the serializer 3A, transmitter 5A and transmission line MC1 to the multiplex transmission unit TRU-2, and then to the receiver 6B and deserializer 4B. However, even when the signal having passed the deserializer 4B is applied to the memory circuit F, the output signal of the memory circuit F (the output of the Q output terminal of the flip-flop 10), namely, the control signal of the switching circuit W becomes "0" because the value of the signal is "0". Accordingly, the connection state of the switching circuit W (in which the movable contact 36 is connected to the stationary contact 34) is held intact.

When the value of the signal entering the terminal E1 via the cable Ca1 is "0", the same state as described above is established, and the switching circuit W of the corresponding transmission line change-over circuit Qb1 on the side of the multiplex transmission processing unit TRU-2 holds the aforementioned state. Since the resistor RG is also inserted near this switching circuit W, the value "0" is exhibited. Such situation is equivalent to the case where the signal of the value "0" has been transmitted between the mutually corresponding cables Ca1 and Cb1. The above states are also realized between the transmission line change-over circuits Qa2, . . . and Qan and the corresponding ones Qb2, . . . and Qbn.

Figure 6A:
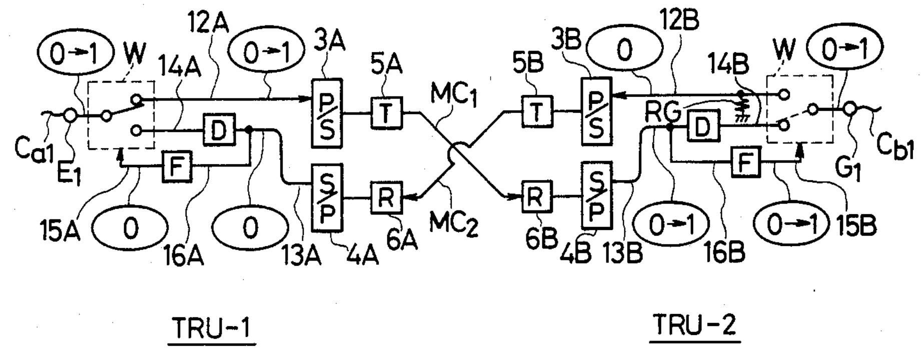
FIGS. 6(*a*), 6(*b*) and 6(*c*) are explanatory diagrams showing the states of signal transmission in FIG. 2.
Figure 6B:
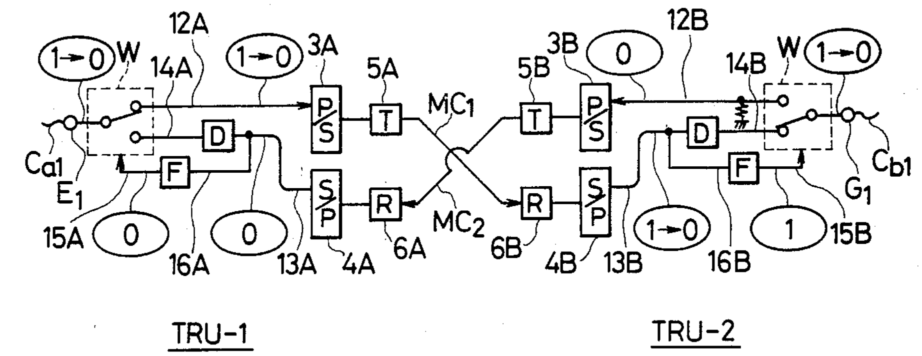
Figure 6C:
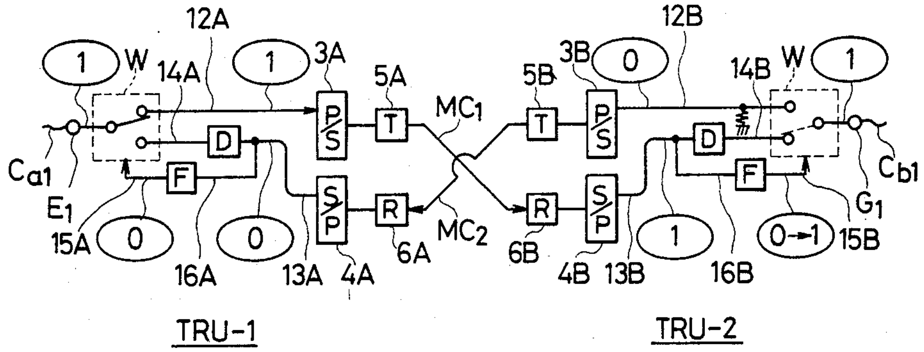

Transmission channels in the case where the value of the signal applied from the cable has changed are illustrated in FIGS. 6(*a*) and 6(*b*). In order to facilitate the explanation, these figures depict the mutually corresponding transmission line change-over circuits Qa1 and Qb1 extracted from FIG. 2.

FIG. 6(*a*) illustrates the changes of the values of signals at various parts and the change of the connectional situation of the switching circuit W in the case where the value of the signal applied from the cable Ca1 connected to the terminal E1 of the multiplex transmission processing unit TRU-1 has changed from "0" to "1". Here, values enclosed with ellipses indicate the signal changes, and the movable contact 36 shown by a broken line within the switching circuit W indicates the connection immediately after the change-over. The change from "0" to "1" in the transmission line change-over circuit Qa1 of the multiplex transmission processing unit TRU-1 is conveyed to the receiver 6B of the multiplex transmission processing unit TRU-2 through the stationary contact 34, wiring lead 12A, serializer 3A, transmission 5A and transmission line MC1. The serializer 3A produces the serial signal in which, not only the information signal of the wiring lead 12A of the transmission line change-over circuit Qa1, but also the information signals of the wiring leads 12A of the respective transmission line change-over circuits Qa2–Qan are arrayed in series every bit. This serial signal is applied to the receiver 6B. Thereafter, the signal conveyed to the receiver 6B is applied to the memory circuit F of the transmission line change-over circuit Qb1 through the deserializer 4B and the wiring leads 13B and 16B. the deserializer 4B separates the serial signal in which the information signals sent by the respective wiring leads 12A are arrayed in series every bit, into the individual information signals, whereupon it delivers the respective 1-bit signals to the n wiring leads 13B connected to the shift register. The arrayal of the information signals stored in the n flip-flops of the shift register of the serializer 3A corresponds to the arrayal of the information signals stored in the n flip-flops constituting the shift register of the deserializer 4B. When the corresponding relationship differs, the signals are not conveyed to predetermined transmission positions, and the control and display are disordered.

The output of the memory circuit F in the transmission line change-over circuit Qb1 changes from "0" to "1" which is delivered to the wiring lead 15B, so that the movable contact 36 of the switching circuit W is changedover as indicated by the broken line (is connected to the stationary contact 35). Accordingly, the change of the signal entering the terminal E1, from "0" to "1" is delayed in the delay circuit D of the transmission line change-over circuit Qb1 by a period of time (for example, 1 bit) equal to the change-over time of the switching circuit W, whereupon the delayed change is conveyed from the terminal G1 to the cable Cb1 via the changed-over switching circuit W of the signal line change-over circuit Qb1.

On the other hand, the input signal of the serializer 3B of the multiplex transmission processing unit TRU-2 is rendered "0" by the resistor RG. This signal of the value "0" is applied to the receiver 6A of the multiplex transmission processing unit TRU-1 through the serializer 3B, transmitter 5B and transmission line MC2. The signal is thereafter applied to the memory circuit F through the deserializer 4A, but the output of the memory circuit F becomes "0" because of the value "0". Accordingly, the connectional situation of the switching circuit W of the transmission line change-over circuit Qa1 remains unchanged.

In the above way, the transmission channel is constructed so that the signal of the cable Ca1 connected to the contact E1 may be transmitted to the cable Cb1 which is connected to the terminal G1 of the multiplex transmission processing unit TRU-2.

Even when the signal of the cable Ca1 has returned to the original value ("0") after the construction of the transmission channel as described above, the transmission channel once established does not change unless the reset switches RW1 and RW2 (FIG. 2) are depressed. This will be understood from FIG. 6(*b*). It is assumed that the value of the cable Ca1 is restored from "1" to "0" as illustrated in FIG. 6(*b*). As shown in FIG. 6(*a*), this change is sent to the transmission line change-over circuit Qb1 of the multiplex transmission processing unit TRU-2 and is conveyed to the memory circuit F. However, the output of the memory circuit F of the transmission line change-over circuit Qb1 remains unchanged at "1". Accordingly, the connectional status of the switching circuit W of the transmission line change-over circuit Qb1 does not change, and the signal change state illustrated in FIG. 6(*b*) is conveyed to the signal cable Cb1 via the delay circuit D and through the switching circuit W. In this manner, the transmission channel undergoes no change and is maintained as it is.

In the above, it has been described that, after the reset switches RW1 and RW2 have been depressed, the signal to be transmitted by the cable undergoes a change, whereby the transmission channel is formed. Next, the formation of a transmission channel in the case where a signal is already existent on the signal cable when the reset switches RW1 and RW2 have been depressed will be described with reference to FIG. 6(*c*).

When the signal having been sent by the cable Ca1 connected to the terminal E1 of the transmission line change-over circuit Qa1 of the multiplex transmission processing unit TRU-1 is "1" as indicated in FIG. 6(*c*), this signal of "1" is transmitted to the receiver 6B of the multiplex transmission processing unit TRU-2 via the serializer 3A, transmitter 5A and transmission line MC1. The signal of the value "1" enters the memory circuit F of the transmission line change-over circuit Qb1, and changes the output of this memory circuit F from "0" to "1". Thus, the movable contact 36 of the switching circuit W of the transmission line change-over circuit Qb1 is changed-over to the side indicated by a broken line (is connected to the stationary contact 35), and the aforementioned signal of the value "1" reaches the cable Cb1 via the delay circuit D and through the changed-over switching circuit W. Even when the value of a signal thereafter conveyed by the cable Ca1 is "0", the situation is the same as in the foregoing case of FIG. 6(*b*), and the transmission channel once formed is held intact unless the memory circuit F is reset.

In the foregoing description of all the operations, the signals have been generated on the side of the control panel 1, and the signal transmission has been in the direction from the multiplex transmission processing unit TRU-1 toward the multiplex transmission processing unit TRU-2. As apparent from the illustration, however, the multiplex transmission processing units TRU-1 and TRU-2 are symmetric to each other in the circuit arrangement Accordingly, even in a case where a signal is generated on the side of the control device 2A and where it is transmitted in a direction from the multiplex transmission processing unit TRU-2 toward the multiplex transmission processing unit TRU-1, a transmission channel is automatically constructed as in the foregoing.

In the present embodiment, the signal of the wiring lead 12A in the transmission line change-over circuit communicating with the cable Ca connected to the indicator LT is "0". In addition, the signal of the wiring lead 12B in the transmission line change-over circuit communicating with the cable Cb connected to the equipment to-be-controlled becomes "0".

While the above embodiment is concerned with the case where the signals to be handled by the signal cables are the digital signals, a case where signals to be handled are analog signals will be explained below as another embodiment in conjunction with FIGS. 7(*a*) and 7(*b*). In the figures, A/D denotes an analog-to-digital converter, and D/A a digital-to-analog converter. DY denotes a delay circuit for an analog signal, the delay time of which is set to be somewhat longer than the operating time of the switching circuit W. P indicates a signal detector circuit which detects the presence or absence of the analog signal, and the circuit arrangement of which is exemplified in FIG. 8. Numeral 50 designates a comparator, one pair of input ends of which are respectively supplied with voltages $V_{in}$ and $V_s$ as shown in the figure. When the voltage $V_{in}$ is equal to or greater than the voltage $V_s$, the output $V_{out}$ of the comparator 50 provides a logic value "1", and when the voltage $V_{in}$ is smaller than the voltage $V_s$, the output $V_{out}$ provides a logic value "0". $R_1$ and $R_2$ denote resistors. F denotes a memory circuit which receives the output $V_{out}$ in the form of the logic signal, and which has the same circuit arrangement as shown in FIG. 5. In addition, a potential $V_E$ at one end of the resistor $R_2$ is set to be slightly lower than the voltage $V_s$. Further, this potential $V_E$ is slightly lower than the lower limit $V_1$ of the varying range $V_1$–$V_2$ of a signal which is applied to an input terminal 40. The setting conditions of these values $V_E$, $V_s$ and $V_1$ are indicated in Equation (1):

$$\frac{R_2}{R_1 + R_2}(V_E - V_1) + V_E \geqq V_s \quad (1)$$

As seen from the circuit arrangement, when no signal is applied to the input terminal 40, $V_{in}$ becomes substantially equal to $V_E$ subject to the high input impedance of the comparator 50. Therefore, $V_{in}$ becomes lower than $V_s$, and the output $V_{out}$ becomes "0". On the other hand, once the value "1" has been received, the memory circuit F functions to store it, as described before.

Accordingly, when the value "1" is firstly applied to a reset terminal 41 to reset the flip-flop 10 of the memory circuit F in advance, the value of the signal of an output terminal 42 is "0" in the absence of any signal at the input terminal 40, and the signal of the output terminal 42 becomes "1" in the presence of a signal at the input terminal 40. Once "1" has been established, this value is held irrespective of the presence or absence of a signal at the input terminal 40.

Figure 7A:
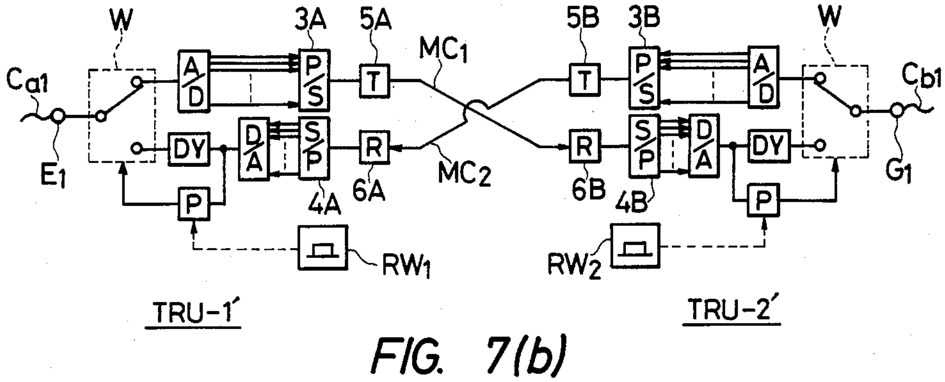
FIGS. 7(*a*) and 7(*b*) are explanatory diagrams showing the arrangement of another embodiment of the present invention and the transmission states of signals.
Figure 7B:
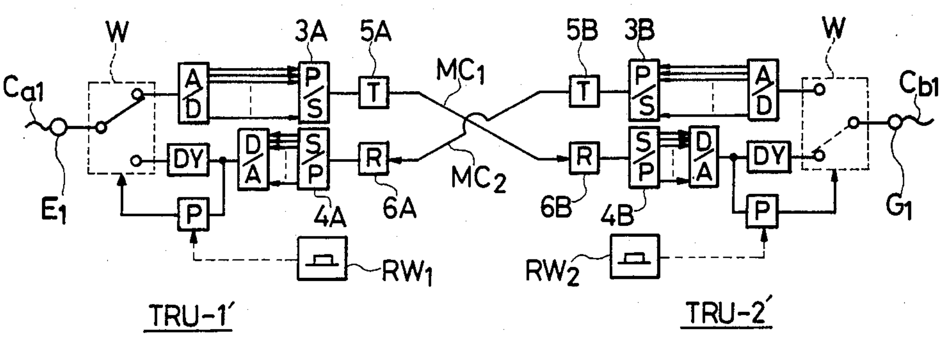
Figure 8:
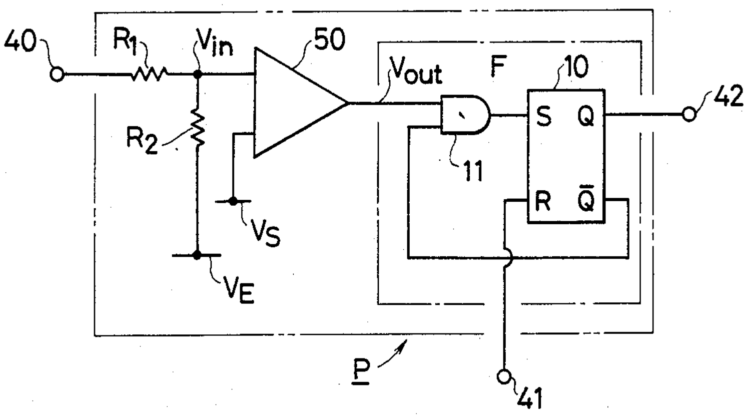
FIG. 8 is a detailed arrangement diagram of a signal detector circuit in FIGS. 7(*a*) and 7(*b*).

Reference is had back to FIGS. 7(*a*) and 7(*b*). First, FIG. 7(*a*) shows the initial states of multiplex transmission processing units TRU-1′ and TRU-2′ after the depression of the reset switches RW. When neither of the cables Ca1 and Cb1 has a signal, the outputs of both the signal detector circuits P are "0", and the switching circuits W continue their statuses as they are. Now, FIG. 7(*b*) illustrates the situation in which a transmission channel is formed when a signal has come to the cable Ca1. The analog signal from the cable Ca1 passes the converter A/D of the multiplex transmission processing unit TRU-1′ to be converted into a digital signal, which passes the serializer 3A as well as the transmitter 5A and is transmitted to the multiplex transmission processing unit TRU-2′ via the transmission line MC1. This signal reverts to an analog signal via the receiver 6B, deserializer 4B and the converter D/A of the multiplex transmission processing unit TRU-2′, and the analog signal enters the signal detector circuit P. The signal detector circuit P has its output value changed from "0" to "1" in accordance with the operating principle stated before. Thus, the movable contact 36 of the switching circuit W has its connectional situation changed as indicated by a broken line. Accordingly, the analog signal delivered from the converter D/A enters the delay circuit DY in parallel with the entry into the signal detector circuit P and is delayed therein, whereupon the delayed signal arrives at the cable Cb1 through the changed-over switching circuit W. In this way, if the signal should disappear from the cable Ca1, the transmission channel once formed will be held unless the reset switches RW1 and RW2 are depressed.

What is claimed is:

1. A multiplex transmission system having a transmission unit comprising a transmitter, a receiver, a serializer which is connected to said transmitter and which produces a serial information signal wherein a plurality of received information signals are arrayed in series, a deserializer which is connected to said receiver and which separates a received serial information signal into a plurality of information signals, a plurality of change-over means connected to a plurality of signal transmisstion cables respectively and for connecting the corresponding signal transmission cables to either said serializer or said deserializer, and change-over control means provided for each said change-over means and for receiving the information signal separated by said deserializer and for controlling a connectional status of the corresponding change-over means on the basis of the received information signal, including delay means connected to said deserializer and said corresponding change-over means and for receiving the information signal delivered from said deserializer, and memory means connected to said deserializer and said corresponding change-over means and for receiving the information signal delivered from said deserializer without being passed through said delay means.

2. A multiplex transmission system according to claim 1, wherein each of said deserializer and said serializer includes a shift register.

3. A multiplex transmission system having a transmission unit comprising a transmitter, a receiver, a serializer which is connected to said transmitter and which produces a serial information signal wherein a plurality of received information signals are arrayed in series, a deserializer which is connected to said receiver and which separates a received serial information signal into a plurality of information signals, a plurality of change-over means connected to a plurality of signal transmission cables respectively and for connecting the corresponding signal transmission cables to either said serializer or said deserializer, and change-over control means provided for each said change-over means and for receiving the information signal separated by said deserializer and for controlling a connectional status of the corresponding change-over means on the basis of the received information signal, wherein each of said deserializer and said serializer includes a shift register and said memory means is a flip-flop.

4. A multiplex transmission system including a first transmission unit and a second transmission unit which is arranged at a position spaced from said first transmission unit; said first transmission unit comprising a first transmitter, a first receiver, a first serializer which is connected to said first transmitter and which produces a serial information signal wherein a plurality of received information signals are arrayed in series, a first deserializer which is connected to said first receiver and which separates a received serial information signal into a plurality of information signals, a plurality of first change-over means connected to a plurality of first signal transmission cables respectively and for connecting the corresponding first signal transmission cables to either of said first serializer or said first deserializer, and first change-over control means disposed for said each first change-over means for receiving the information signal separated by said first deserializer and for controlling a connectional status of the corresponding first change-over means on the basis of the received information signal; said second transmission unit comprising a second transmitter which is connected to said first receiver, a second receiver which is connected to said first transmitter, a second serializer which is connected to said second transmitter and which produces a serial information signal wherein the plurality of received information signals are arrayed in series, a second deserializer which is connected to said second receiver and which separates a received serial information signal into a plurality of information signals, a plurality of second change-over means connected to a plurality of second signal transmission cables respectively and for connecting the corresponding second signal transmission cables to either said second serializer or said second deserializer, and second change-over control means disposed for each said second change-over means for receiving the information signal separated and delivered by said second deserializer and for controlling a connectional status of the corresponding second change-over means on the basis of the received information signal, wherein said first change-over means comprises first delay means connected to said first deserializer and said corresponding first change-over means and for receiving the information signal delivered from said first deserializer, and first memory means connected to said first deserializer and said corresponding first change-over means and for receiving an information signal delivered from said first deserializer without being passed through said first delay means, and said second change-over control means comprises second delay means connected to said second deserializer and said corresponding second change-over means and for receiving an information signal delivered from said second deserializer, and second memory means connected to said second deserializer and said corresponding second change-over means and for receiving the information signal delivered from said second deserializer without being passed through said second delay means.

5. A multiplex transmission system including a first transmission unit and a second transmission unit which is arranged at a position spaced from said first transmission unit; said first transmission unit comprising a first transmitter, a first receiver, a first serializer which is connected to said first transmitter and which produces a serial information signal wherein a plurality of received information signals are arrayed in series, a first deserializer which is connected to said first receiver and which separates a received serial information signal into a plurality of information signals, a plurality of first change-over means connected to a plurality of first signal transmission cables respectively and for connecting the corresponding first signal transmission cables to either of said first serializer or said first deserializer, and first change-over control means provided for said each first change-over means for receiving the information signal separated by said first deserializer and for controlling a connectional status of the corresponding first change-over means on the basis of the received information signal; said second transmission unit comprising a second transmitter which is connected to said first receiver, a second receiver which is connected to said first transmitter, a second serializer which is connected to said second transmitter and which produces a serial information signal wherein the plurality of received information signals are arrayed in series, a second deserializer which is connected to said second receiver and which separates a received serial information signal into a plurality of information signals, a plurality of second change-over means connected to a plurality of second signal transmission cables respectively and for connecting the corresponding second signal transmission cables to either of said second serializer or said second deserializer, and second change-over control means provided for each said second change-over means for receiving the information signal separated by said second deserializer and for controlling a connectional status of the corresponding second change-over means on the basis of the received information signal; wherein said first transmission unit includes first reset means for clearing said first change-over means to said first serializer, and said second transmission unit includes second reset means for clearing said second change-over control means thereby to connect said second change-over means to said second serializer.

6. A multiplex transmission system according to claim 4 or 5, wherein said first signal transmission cables are connected to either of control means and indication means disposed in a control panel, and said second signal transmission cables are connected to either of a controller and a measuring instrument of an equipment to-be-controlled disposed in a plant.

7. A multiplex transmission system according to claim 4, wherein said first transmission unit includes first reset means for clearing said first change-over control means thereby to connect said first change-over means to said first serializer, and said second transmission unit includes second reset means for clearing said second change-over control means thereby to connect said second change-over means to said second serializer.

8. A multiplex transmission system according to claim 4 or 7, wherein each of said first and second deserializers and said first and second serializers has a shift register.

9. A multiplex transmission system according to claim 8, wherein each of said first and second memory means is a flip-flop.

10. A multiplex transmission system for transferring signals among a plurality of stations, in which a transmission unit is provided at each station and multiplex signal transmission cables connect the transmission units of said stations, wherein each transmission unit comprises:

a transmitter connected to a multiplex signal transmission cable for sending out a serial information signal produced in a station;

a receiver connected to another multiplex signal transmission cable for receiving a transmitted serial information signal;

a serializer connected to said transmitter for producing said serial information signal to be sent out by said transmitter from a plurality of information signals generated in the station;

a deserializer connected to said receiver for separating a received serial information signal into a plurality of information signals;

a plurality of change-over means connected to a plurality of signal cables arranged within the station for connecting the corresponding signal cables to said serializer in an initial condition; and change-over control means provided for each said change-over means and responsive to the information signal separated by said deserializer for controlling the operating status of the corresponding change-over means so that the corresponding signal cables are selectively connected to either said serializer or said deserializer on the basis of said information signal, whereby the operating status of the change-over means is maintained until said change-over control means is reset.

11. A multiplex transmission system for transferring signals between two stations remote from each other, which includes a first transmission unit in a first station, a second transmission unit in a second station, and a pair of multiplex signal transmission cables connecting said first and second transmission units;

said first transmission unit comprising:

a first transmitter connected to one said pair of the multiplex signal transmission cables;

a first receiver connected to the ohter of said pair of multiplex signal transmission cables;

a first serializer connected to said first transmitter for producing a serial information signal from a plurality of information signals generated in the first station;

a first deserializer connected to said first receiver for separating a received serial information signal into a plurality of information signals;

a plurality of first change-over means connected to a plurality of first signal cables provided within the first station and for connecting the corresponding first signal cables to said first serializer in an initial condition; and first change-over control means provided for each said first change-over means and responsive to the information signal separated by said first deserializer for controlling the operating status of the corresponding first change-over means so that the corresponding first signal cables are selectively connected to either said first serializer or said first deserializer on the basis of said information signal; and said second transmitter which is connected to said first receiver through the other of said pair of multiplex signal transmission cables;

a second receiver which is connected to said first transmitter through the one of said pair of multiplex signal transmission cables;

a second serializer connected to said second transmitter for producing a serial information signal from a plurality of information signals generated in the second station;

a second deserializer connected to said second receiver for separating a received serial information signal into a plurality of information signals;

a plurality of second change-over means connected to a plurality of second signal cables provided within the second station for connecting the corresponding second signal cables to said second serializer in an initial condition; and second change-over control means provided for each said second change-over means and responsive to the information signal separated by said second deserializer for controlling the operating status of the corresponding second change-over means so that the corresponding second signal cables are selectively connected to either said second serializer or said second deserializer on the basis of said information signal.

* * * * *